United States Patent [19]

Verber et al.

[11] Patent Number: 4,613,204
[45] Date of Patent: Sep. 23, 1986

[54] D/A CONVERSION APPARATUS INCLUDING ELECTROOPTICAL MULTIPLIERS

[75] Inventors: Carl M. Verber; Thomas B. Smith; Philip M. Dunson, all of Columbus, Ohio

[73] Assignee: Battelle Memorial Institute, Columbus, Ohio

[21] Appl. No.: 555,242

[22] Filed: Nov. 25, 1983

[51] Int. Cl.[4] .................. G02B 6/10; G05B 15/08; H03M 1/00
[52] U.S. Cl. .................... 350/96.14; 350/96.10; 350/96.13; 350/356; 350/358; 364/135; 364/713; 364/821; 364/822; 340/347 M
[58] Field of Search ............ 350/96.10, 96.11, 96.12, 350/96.13, 96.14, 96.16, 96.19, 353, 355, 356, 358; 340/347 R, 347 M; 364/135, 700, 713, 819, 821, 822; 324/77 K

[56] References Cited

U.S. PATENT DOCUMENTS

| | | | |
|---|---|---|---|
| 3,985,423 | 10/1976 | Tseng | 350/96.13 |
| 4,058,722 | 11/1977 | Taylor | 350/96.14 |
| 4,185,274 | 1/1980 | Giallorenzi | 350/96.1 |
| 4,403,833 | 9/1983 | Kenan et al. | 350/96.14 |
| 4,415,226 | 11/1983 | Verber et al. | 350/96.14 |
| 4,425,024 | 1/1984 | Keil et al. | 350/96.14 |
| 4,467,276 | 8/1984 | Marten et al. | 350/96.24 |
| 4,544,229 | 10/1985 | Verber | 350/96.14 |
| 4,544,230 | 10/1985 | Caulfield | 350/96.14 |
| 4,561,728 | 12/1985 | Kenan et al. | 350/356 |
| 4,567,569 | 1/1986 | Caulfield et al. | 364/845 |

FOREIGN PATENT DOCUMENTS 0042999 1/1982 European Pat. Off. .......... 350/96.13

OTHER PUBLICATIONS

Taylor, "An Electrooptic Analog-to-Digital Converter", Proceedings of the IEEE, vol. 63, pp. 1524-1524, 1975.
Leonberger et al., "4-Bit 828 Megasample/s Electro-Optical Guided Wave Analog-to-Digital Coverter", Appl. Phys. Lett., vol. 140, No. 7, 4/82, pp. 565-568.
Verber et al., "Correlator Based on an Integrated Optical Spatial Light Modulator", Applied Optics vol. 20, No. 9, 5/81, pp. 1626-1629.

*Primary Examiner*—William L. Sikes
*Assistant Examiner*—Brian M. Healy
*Attorney, Agent, or Firm*—Philip M. Dunson

[57] ABSTRACT

Apparatus (FIG. 1) receives electrical input potentials (11A-11D) representing components, e.g. coefficients (zero or one), of weighted digital input data, and provides analog optical output (12) proportional to the sum of the weighted digital values in the input data. An electrooptic waveguide (13) has four adjacent electrooptic diffractive means (14A-14D), each responsive to a separate component of the digital input data and comprising a first electrode (15A-15D) and a second electrode (16A-16D) on the waveguide (13) for temporarily changing the index of refraction when different electrical potentials are present thereon, and thus forming a Bragg grating therein with a direction of Bragg incidence in the same input direction (17) and a direction of Bragg diffraction in the same output direction (18). A coupling prism (21) directs light from a laser (20) to enter into each diffractive means (14A-14D) in the input direction (17). Binary digital circuitry (24) provides, via voltage dividers (25A-25D), an electrical potential (at 27A-27D, 26) to each electrode (15A, etc., 16A, etc) in each diffractive means (14A, etc), such that the difference between the potentials at the electrodes (15A, 16A, etc) for each diffractive means (14A, etc) responsive to a component of the data (24) having the value of one forms a Bragg grating that diffracts in the output direction (18) a portion (Io8, Io/4, Io/2, Io) of the input light (22) having an intensity proportional to the weighted value ($2^{-3}$, $2^{-2}$, $2^{-1}$, $2^0$) of that component of the digital input data (24).

8 Claims, 7 Drawing Figures

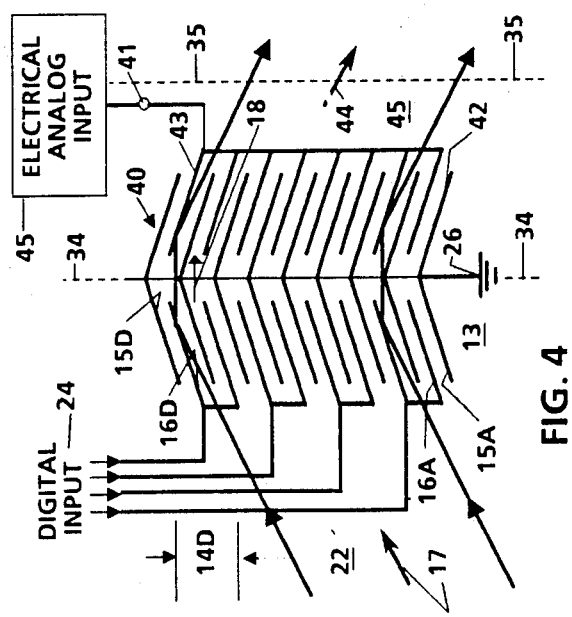
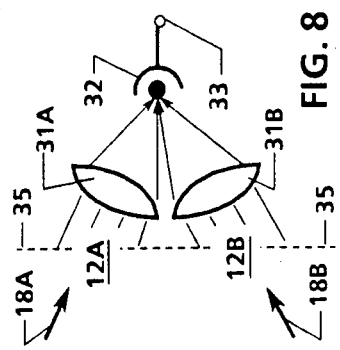
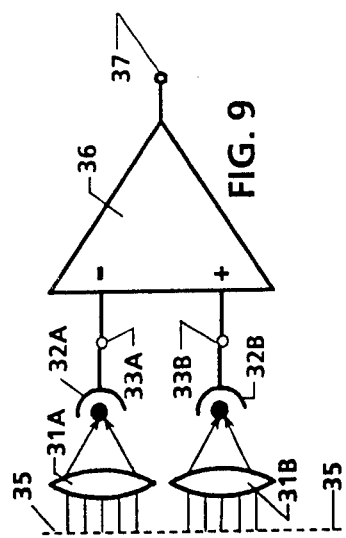
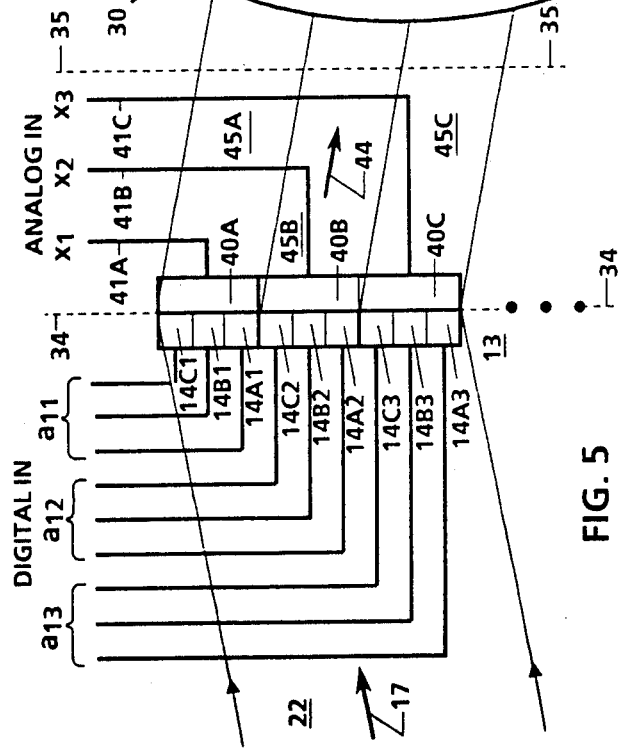
FIG. 4
FIG. 8
FIG. 9
FIG. 5

D/A CONVERSION APPARATUS INCLUDING ELECTROOPTICAL MULTIPLIERS

FIELD OF THE INVENTION

This invention relates to the conversion of electronic digital signals to optical analog signals and to various uses of the analog signals. The invention has to do primarily with apparatus for receiving electrical input potentials representing components of weighted digital input data, and for providing analog optical output approximately proportional to the sum of the weighted digital values in the input data. Such apparatus is especially useful in the processing of binary data.

BACKGROUND OF THE INVENTION

The present invention is related to the subject matter of the following U.S. patents and copending U.S. patent applications:

A. Richard P. Kenan and Carl M. Verber, Electrooptical Multipliers; U.S. Pat. No. 4,403,833, Sept. 13, 1983.
B. Carl M. Verber and Richard P. Kenan, Controlling Light; U.S. Pat. No. 4,415,226, Nov. 15, 1983.
C. Richard P. Kenan and Carl M. Verber, Electrooptical Comparators; U.S. patent application Ser. No. 344,116, filed Jan. 29, 1982. Now U.S. Pat. No. 4,561,728 issued Dec. 31, 1985
D. Henry John Caulfield, Systolic Array Processing; U.S. patent application Ser. No. 450,153, filed Dec. 15, 1982. Now U.S. Pat. No. 4,567,569, issued Jan. 28, 1986
E. H. J. Caulfield, Polynomial Evaluation; U.S. patent application Ser. No. 459,168, filed Jan. 19, 1983. Now U.S. Pat. No. 4,544,230, issued Oct. 1, 1985
F. Carl M. Verber, Optical Computation; U.S. patent application Ser. No. 459,167, filed Jan. 19, 1983. Now U.S. Pat. No. 4,544,229, issued Oct. 1, 1985
G. Carl M. Verber and Richard P. Kenan, Array Multiplication; U.S. patent application Ser. No. 481,184, filed Apr. 1, 1983, and Ser. No. 573,528, filed Jan. 24, 1984, continuation in part.

Said patents and applications are assigned to the assignee of the present invention. All of the patents and applications cited above are hereby incorporated hereinto by reference and made a part hereof the same as if fully set forth herein for purposes of indicating the background of the present invention and illustrating the state of the art.

Except where otherwise indicated herein, the electrooptic components employed in typical embodiments of the present invention are now well known. Convenient ways of making them are described in the above mentioned patents and applications and in the references cited therein and herein.

The successful demonstration has been reported[1] of a high-speed integrated optic analog to digital (A/D) converter based upon a Mach-Zehnder interferometric technique first suggested by Taylor[2] in 1975. An A/D converter based upon a Fabry-Perot interferometer[3] has been reported also. We present here the design principles, the results of dc tests on a 6-bit device, and dynamic performance estimates of the complementary device, an integrated optic digital to analog (D/A) converter.

The D/A converter is fabricated upon a planar single-mode Ti-indiffused LiNbO$_3$ waveguide. The active element is an electrooptic integrated optic spatial light modulator (IOSLM),[4] which is simply an extended interdigital electrode structure composed of a number of separately addressable segments. The electrode segments are addressed, in parallel, with the voltages representing the digital word to be converted.

In the configuration tested, it is essential that a digital zero be represented by a zero voltage and that all digital ones be represented by a voltage V. As shown in FIG. 1, the voltages representing the digital word are applied to the electrodes through voltage dividers. The dividers are set so that the voltage V, when representing the most significant bit, results in the diffraction of an optical power which we may represent by $P_{max}$. The next divider is set so that the diffracted power is $P_{max}/2$, the next to generate $P_{max}/4$, and so on. The total optical power diffracted by the structure is, therefore, the optical analog representation of the electrical digital input. This optical analog signal may then be used as the input to an analog optical device such as a multiplier,[4] or a lens can be used to direct all of the diffracted light to a photodetector, in which case the electrical analog signal is generated.

FIG. 2 shows the results of a simple proof-of-principle experiment, which was set up by uniformly illuminating the IOSLM with a prism-coupled guided plane wave. The diffracted light was collected by an external lens and directed onto a photodetector. The voltage dividers were individually set as described above, and the system was stepped manually through the digital words 000000 to 111111 by use of toggle switches. The figure shows the analog voltage generated by the photodetector as a function of the digital input word. As can be seen, the system functioned as expected. The kink in the otherwise straight line is thought to be due to a slight missetting of one of the voltage dividers.

The high-speed performance of the integrated optic D/A can be estimated by assuming, for example, that a laser will be used which will result in a diffracted power of 50 $\mu$W from the most significant bit. In this case the maximum diffracted power, when all 6 bits are on, will be 98.44 $\mu$W, and the contribution of the least significant bit (LSB) will be 1.56 $\mu$W, a value which is $-36$ dB down from the maximum. It can be shown that, for direct detection of a 100 $\mu$W signal at a 100-MHz bandwidth, the signal to noise ratio (SNR) of an optical detector is 60 dB.[5] Therefore, the LSB can be detected with an excess SNR of 24 dB. This excess can be retained to achieve a minimum error rate, to increase the number of bits, to increase the operating rate, or to decrease the optical power.

DISCLOSURE

Typical apparatus according to the present invention for receiving electrical input potentials representing components of weighted digital input data, and for providing analog optical output approximately proportional to the sum of the weighted digital values in the input data, comprises an electrooptic waveguide, a plurality of adjacent electrooptic diffractive means, each responsive to a separate component of the digital input data and comprising a first electrode and a second electrode on the waveguide for temporarily changing the index of refraction, when different electrical potentials are present thereon, and thus forming a Bragg grating therein positioned with a direction of Bragg incidence approximately in the same predetermined input direction and with a direction of Bragg diffraction approximately in the same predetermined output direction; light input means for directing light of known or controlled intensity to enter into each diffractive means approximately in the predetermined input direction, and means for providing an electrical potential to each electrode in each diffractive means, such that the difference between the potential at the first electrode and the potential at the second electrode is substantially zero for each diffractive means responsive to a component of the digital input data having the value of zero, and the difference between the potential at the first electrode and the potential at the second electrode for each diffractive means responsive to a component of the digital input data having a value greater than zero is such as to form a Bragg grating that diffracts in the predetermined output direction a portion of the input light having an intensity approximately proportional to the weighted value of that component of the digital input data.

Typically each component of the digital input data having a value greater than zero provides a predetermined potential difference across a voltage divider and the electrodes of the diffractive means responsive thereto are connected across at least a portion of the voltage divider. Typically means are included for adjusting the portion of the voltage divider across which the electrodes are connected.

In some typical embodiments of the invention each component of the digital input data having a value greater than zero provides approximately the same potential difference across a voltage divider and the electrodes of the diffractive means responsive thereto are connected across a portion of the voltage divider that is larger for greater weighting of the component. In other typical embodiments the size of each diffractive means is larger for greater weighting of the component of the digital input data to which it is responsive. Combinations of the foregoing (and/or other) types of weighting means may be included in the same apparatus. Typically the components of the digital input data are weighted, as in binary computation, proportionally to successive integral powers of two.

The electrodes in each diffractive means typically comprise a pair of interdigital electrodes. More particularly the first electrode of each diffractive means typically comprises a first set of substantially straight and parallel, thin, elongate, electrically conductive members connected together at one end, and the second electrode of each diffractive means typically comprises a second set of substantially straight and parallel, thin, elongate, electrically conductive members, interleaved with the first set, insulated therefrom, and connected together at the opposite end.

Typically the plurality of diffractive means are positioned with their electrodes all approximately parallel to each other. Ordinarily at least one electrode of each individual refractive means is insulated from the electrodes of the other individual refractive means. In some typical apparatus each individual refractive means is substantially identical to each of the other individual refractive means. In other typical apparatus the size of at least one individual diffractive means differs from the size of at least one other individual diffractive means.

Apparatus according to the invention typically comprises also output means for receiving the light travelling beyond each diffractive means in the output direction, and typically for directing substantially all of it to means for providing an electric signal of amplitude responsive to the total intensity of the light.

The foregoing and other typical apparatus and combinations thereof according to the present invention are hereinafter described and claimed.

BRIEF DESCRIPTION OF THE DRAWINGS

All of the drawings (except FIG. 2) are schematic plan views of typical apparatus according to the present invention.

FIG. 4 shows apparatus useful in computing the product of a digital numeric datum multiplied by an analog numeric datum.

FIG. 5 shows apparatus useful in computing the vector inner product of digital vector data multiplied by analog vector data, and apparatus useful in computing the matrix product of digital matrix (or vector) data multiplied by analog vector (or matrix) data.

FIG. 8 shows apparatus useful in computing the sum of the absolute value of a digital numeric datum added to the absolute value of another digital numeric datum.

FIG. 9 shows apparatus useful in computing the difference obtained by subtracting the absolute value of a digital numeric datum from the absolute value of another digital numeric datum.

CARRYING OUT THE INVENTION

Figure 1:
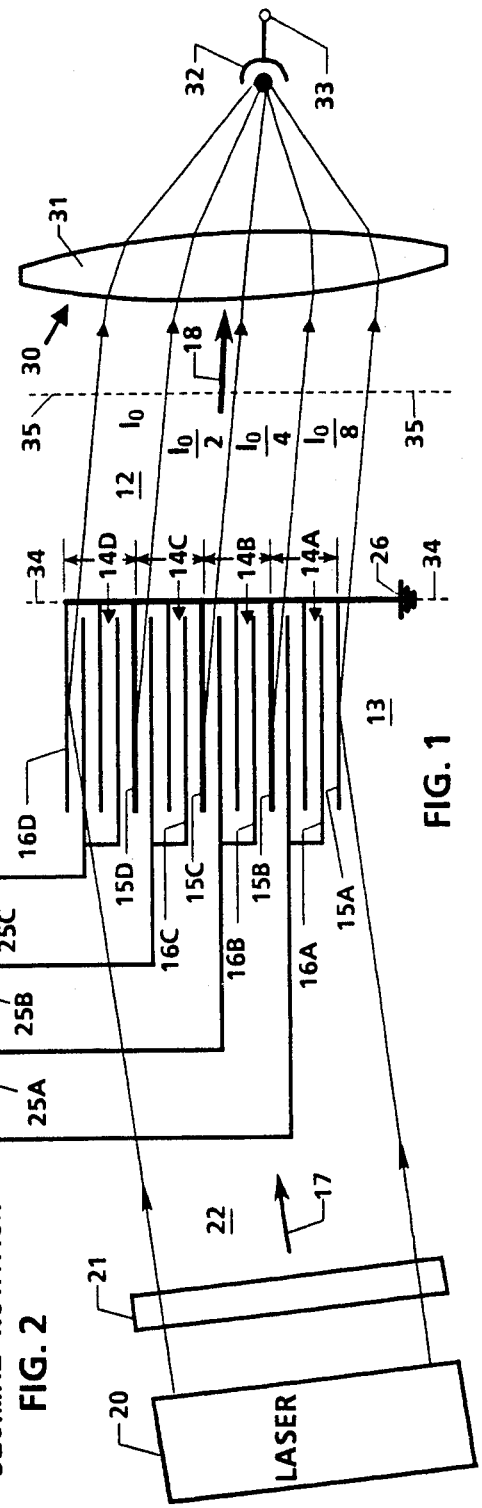
FIG. 1 shows apparatus for converting electrical digital input to optical analog output and then to analog electrical output.

Referring now to FIG. 1, typical apparatus according to the present invention for receiving electrical input potentials 11A–11D representing respectively the values of components of weighted digital input data, and for providing analog optical output 12 approximately proportional to the sum of the weighted digital values in the input data, comprises an electrooptical waveguide 13, a plurality of adjacent electrooptic diffractive means 14A–14D, each responsive to a separate component of the digital input data and comprising a first electrode 15A–15D and a second electrode 16A–16D on the waveguide 13 for temporarily changing the index of refraction, when different electrical potentials are present thereon, and thus forming a Bragg grating therein positioned with a direction of Bragg incidence approximately in the same predetermined input direction 17 and with a direction of Bragg diffraction approximately in the same predetermined output direction 18, light input means, typically comprising a laser 20 and a prism 21, for directing light 22 of known or controlled intensity to enter into each diffractive means 14A–14D approximately in the predetermined input direction 17, and means 24, 25A–25D, 26 for providing an electrical potential to each electrode 15A–15D, 16A–16D in each diffractive means 14A–14D, such that the difference between the potential of the first electrode 15A–15D and the potential of the respective second electrode 16A–16D is substantially zero for each diffractive means 14A–14D responsive to a component of the digital input data 24 having the value of zero, and the difference between the potential at the first electrode 15A–15D and the potential at the second electrode 16A–16D for each diffractive means 14A–14D responsive to a component of the digital input data 24 having a value greater than zero is such as to form a Bragg grating that diffracts in the predetermined output direction 18 a portion (typically $I_0/8$, $I_0/4$, $I_0/2$, $I_0$) of the input light 22 having an intensity approximately proportional to the weighted value (typically $2^{-3}$, $2^{-2}$, $2^{-2}$, $2^0$) of that component of the digital input data 24.

Typically each component of the digital input data 24 having a value greater than zero provides a predetermined potential difference 11A, 11B, 11C, 11D across a voltage divider 25A, 25B, 25C, 25D and the electrodes 15A, 16A–15D, 16D of the diffractive means 14A–14D responsive thereto are connected across at least a portion (typically a/8, a/4, a/2, $a$) of the voltage divider 25A–25D. Typically means, such as movable contacts 27A–27D, are included for adjusting the portion of the voltage divider 25A–25D across which the electrodes 15A, 16A–15D, 16D are connected.

In some typical embodiments of the invention (as exemplified in FIG. 1) each component of the digital input data 24 having a value greater than zero provides approximately the same potential difference 11A, 26–11D, 26 across a voltage divider 25A–25D and the electrodes 15A, 16A–15D, 16D of the diffractive means 14A–14D responsive thereto are connected across a portion 27A, 26–27D, 26 of the voltage divider 25A–25D that is larger for greater weighting of the component. In other typical embodiments (as exemplified in FIG. 3) the size of each diffractive means 14A'–14D' is larger for greater weighting of the component of the digital input data to which it is responsive. The same apparatus may include combinations of both above types of weighting means and/or other (such as having different potentials at 11A, etc; eg 11A<11B<11C<11D). Typically (as mentioned above, and as exemplified in FIGS. 1 and 3) the components of the digital input data 24 are weighted, as in binary computation, proportionally to successive integral powers of two ($2^{-3}$, $2^{-2}$, $2^{-1}$, $2^0$, etc).

The electrodes 15A, 16A, etc in each diffractive means 14A, etc typically comprise a pair of interdigital electrodes 15A, 16A, etc. More particularly the first electrode 15A, etc of each diffractive means 14A, etc typically comprises a first set 15A, etc of substantially straight and parallel, thin, elongate, electrically conductive members (as indicated schematically in FIGS. 1 and 3) connected together at one end (the right end in FIGS. 1 and 3), and the second electrode 16A, etc of each diffractive means 14A, etc typically comprises a second set 16A, etc of substantially straight and parallel, thin, elongate, electrically conductive members (as indicated schematically in FIGS. 1 and 3), interleaved with the first set 15A, etc, insulated therefrom, and connected together at the opposite end (the left end in FIGS. 1 and 3). Typically the plurality of diffractive means 14A, etc are positioned with their electrodes 15A, 16A, etc all approximately parallel to each other as in FIGS. 1 and 3. Ordinarily at least one electrode 16A, etc of each individual refractive means 14A, etc is insulated from the electrodes 15B, etc-16B, etc of the other individual refractive means 14B, etc. In some typical apparatus, as in FIG. 1, each individual refractive means 14A, etc is substantially identical to each of the other individual refractive means 14B, etc. In other typical apparatus, as in FIG. 3, the size of at least one individual diffractive means 14A' etc differs from the size of at least one other individual diffractive means 14B' etc.

Apparatus according to the invention typically comprises also output means 30 for receiving the light 12 travelling beyond each diffractive means 14A, etc in the output direction 18, and typically for directing substantially all of it, as by a lens 31, to means 32 (typically photoelectric means) for providing an electric signal at 33 of amplitude responsive to the total intensity of the light 12 travelling beyond the plurality of diffractive means 14A, etc in the output direction 18.

Referring now to FIGS. 1 and 4, other typical apparatus wherein the components of the digital input data 24 are weighted, as in binary computation, proportionally to successive integral powers of two ($2^{-3}$, $2^{-2}$, $2^{-1}$, $2^0$, etc) comprises an additional electrooptic diffractive means 40 located between the dashed lines 34 and 35 to receive the light 12 travelling beyond each of the plurality of first-mentioned diffractive means 14A, etc, and responsive also to electrical input potentials 41, 26 representing values of analog input data. The additional diffractive means 40 comprises a third electrode 42 and a fourth electrode 43 on the waveguide 13 for temporarily changing the index of refraction, when different electrical potentials are present thereon, and thus forming a Bragg grating therein positioned with a direction of Bragg incidence approximately in the predetermined output direction 18 of the plurality of first-mentioned diffractive means 14A, etc and with a direction of Bragg diffraction approximately in a predetermined different output direction 44. Means 26, 45 provide one electrical potential 26 (ground) to the third electrode 42 and another electrical potential 45 to the fourth electrode 43, and thereby direct in the different output direction 44 light 45 having a total intensity that is approximately proportional to the product of the weighted value represented by the digital input data 24 multiplied by the value represented by the analog input data 45.

FIG. 5 shows a plurality of apparatuses as in FIG. 4, each arranged adjacent to and in tandem with another, and thereby to direct in the different output direction 44 light 45A, 45B, 45C having a total intensity that is approximately proportional to the sum of the individual products $a_{11} \cdot x_1$, $a_{12} \cdot x_2$, $a_{13} \cdot x_3$ of values represented by the input data to the individual apparatuses and thus is responsive to the vector inner product of the two vectors comprising respectively the set of individual digital input values $a_{11}$, $a_{12}$, $a_{13}$ and the set of individual analog values $x_1$, $x_2$, $x_3$.

Of course apparatus as in FIG. 4, or apparatus as in FIG. 5, may comprise also output means 30 for receiving the light 45; or 45A, 45B, 45C travelling beyond the additional diffractive means 40; or 40A, 40B, 40C in the different output direction 44 and directing substantially all of it to means 31, 32 for providing an electric signal (at 33) of amplitude responsive to the intensity of the light 45; or 45A, 45B, 45C and thus providing an indication responsive to the said product, or responsive to the said vector inner product.

Other combination apparatus may comprise a plurality of apparatuses as in FIG. 5, each with separate output means 30, and each receiving digital inputs $a_{11}$, $a_{12}$, etc representing individual values in a matrix (or in a vector) and analog inputs $x_1$, $x_2$, etc representing individual values in a vector (or in a matrix) and thus providing a set of electrical signals useful for providing indications responsive to the product of the matrix multiplied by the vector.

Figure 6:
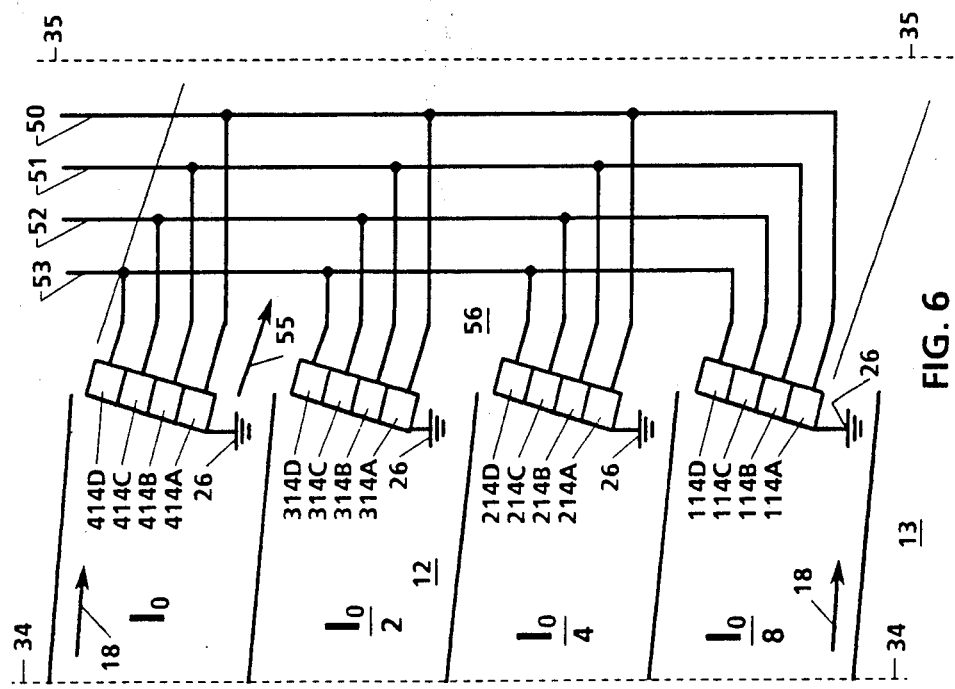
FIG. 6 shows apparatus useful in computing the product of a digital numeric datum multiplied by another digital numeric datum.

Referring now to FIGS. 1 and 6, other typical apparatus wherein the components of the digital input data 24 are weighted, as in binary computation, proportionally to successive integral powers of two ($2^{-3}$, $2^{-2}$, $2^{-1}$, $2^0$, etc) comprises a plurality of sets of additional electrooptic diffractive means 114A–114D; 214A–214D; 314A–314D; 414A–414D located to receive the light 12 travelling beyond each of the plurality of first-mentioned diffractive means 14A–14D, and responsive also to electrical input potentials 50, 51, 52, 53; 26 representing additional digital input data; each set of additional diffractive means 114A, etc414A etc comprises a plurality of adjacent electrooptic diffractive means 114A, 114B, 114C, 114D; etc each responsive to a separate component of the additional digital input data, and comprising a third electrode and a fourth electrode (as in FIG. 1) on the waveguide 13 for temporarily changing the index of refraction, when different electrical potentials are present thereon, and thus forming a Bragg grating therein positioned with a direction of Bragg incidence approximately in the predetermined output direction 18 of the plurality of first-mentioned diffractive means 14A, etc and with a direction of Bragg diffraction approximately in another predetermined output direction 55; each set of additional diffractive means being located to receive the light ($I_o/8$, $I_o/4$, $I_o/2$, $I_o$) travelling beyond a different one of the first-mentioned plurality of adjacent diffractive means 14A, etc; and means 26; 50, 51, 52, 53 for providing one electrical potential 26 (ground) to the third electrode and another electrical potential 50, 51, 52, 53 to the fourth electrode of each additional diffractive means 114A–414D according to the value of its component of the additional digital input data, and thereby to direct in the other output direction 55 light 56 having a total intensity that is approximately proportional to the product of the value represented by the first-mentioned digital input data 24 multiplied by the value represented by the additional digital input data 50–53.

Figure 7:
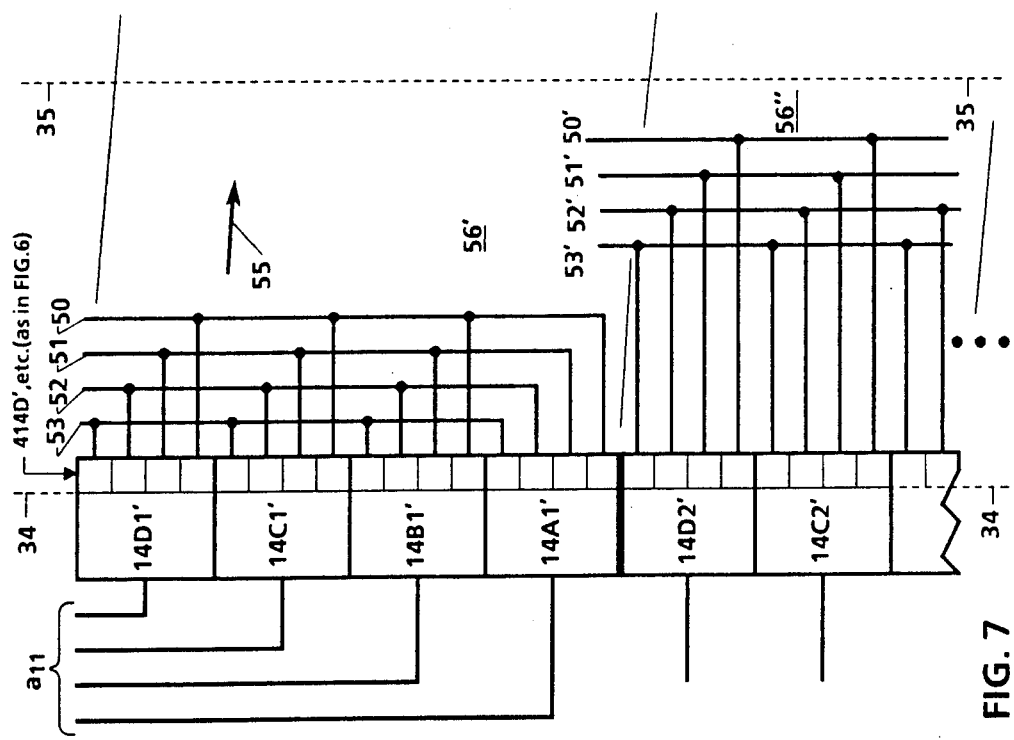
FIG. 7 shows apparatus useful in computing the vector inner product of digital vector data multiplied by other digital vector data, and apparatus useful in computing the matrix product of digital matrix data multiplied by digital vector data.

FIG. 7 shows a plurality of apparatuses as in FIG. 6, each arranged adjacent to and in tandem with another, and thereby to direct in the other output direction 55 light 56', 56", etc having a total intensity that is approximately proportional to the sum of the individual products of values represented by the input data to the individual apparatuses and thus is responsive to the vector inner product of the two vectors comprising the two sets of individual digital input values.

Of course apparatus as in FIG. 6, or apparatus as in FIG. 7, may comprise also output means 30, as in FIG. 1, for receiving the light 56 or 56' travelling beyond the additional diffractive means 414D etc or 414D' etc in the other output direction 55 and directing substantially all of it to means 31, 32 for providing an electric signal (at 33) of amplitude responsive to the intensity of the light 56 or 56' and thus providing an indication responsive to the said product, or responsive to the said vector inner product.

Other combination apparatus may comprise a plurality of apparatuses as in FIG. 7, each with separate output means 30 as in FIG. 1, and each receiving digital inputs $a_{11}$, etc representing individual values in a matrix and digital inputs 50, etc representing individual values in a vector and thus providing a set of electrical signals useful for providing indications responsive to the product of the matrix multiplied by the vector.

Of course the electrooptic diffractive means on each side of the dashed line 34 in FIGS. 4, 5, and 7 (and in the combination of FIG. 1 with the apparatus of FIG. 6 inserted between the dashed lines 34 and 35) may be located alternatively on the sides opposite from those shown without changing the overall functioning of the apparatus. Stated in other words, the optical inputs and outputs could be exchanged.

Referring now to FIGS. 1 and 8, still other typical apparatus wherein the components of the digital input data 24 are weighted, as in binary computation, proportionally to successive integral powers of two ($2^{-3}$, $2^{-2}$, $2^{-1}$, $2^0$, etc) comprises a plurality of such apparatuses, each arranged adjacent to another with approximately, or at least generally, the same orientation; and output means 31A, 31B, 32 for providing an electrical signal (at 33) of amplitude responsive to the total intensity of the light 12A, 12B travelling beyond the plurality of diffractive means 14A, etc in the output direction 18A, 18B of each said apparatus. Typical output means comprises means such as lenses 31A, 31B for receiving the light 12A, 12B travelling beyond each diffractive means 14A, etc in its output direction 18A, 18B and directing substantially all of it to photoelectric means 32 and thereby providing an indication responsive to the sum of the absolute values represented by the input data 24. Where the output directions 18A, 18B are substantially the same, a single lens 31 may be used to direct substantially all of the light 12A, 12B to the photoelectric means 32.

Referring now to FIGS. 1 and 9, other typical apparatus wherein the components of the digital input data 24 are weighted, as in binary computation, proportionally to successive integral powers of two ($2^{-3}$, $2^{-2}$, $2^{-1}$, $2^0$, etc) comprises two such apparatuses, for convenience typically, but not necessarily, located adjacent to each other as in FIG. 9, each such apparatus comprising also output means 31A, 32A; 31B, 32B for providing an electric signal (at 33A; 33B) of amplitude responsive to the total intensity of the light travelling beyond the plurality of diffractive means 14A, etc in the output direction; and means for combining the electric signals from the two apparatuses in opposition to each other and thereby providing an indication responsive to the difference between the two absolute values represented by the input data to the two apparatuses. Typically each output means comprises photovoltaic means 32A, 32B for providing an electric potential relative to, and in the same direction from a common potential (such as a ground potential) and thereby providing a potential difference (at 33A, 33B) between the two photovoltaic means 32A, 32B indicative of the said difference between represented values. Optionally the output means may include further circuitry 36, conventional or otherwise, for providing an electrical difference output (at 37).

APPLICABILITY

Apparatus according to the present invention is especially useful in the processing of binary data from digital electrical circuits by optical apparatus responsive to analog quantities.

In general, the output light in any of the apparatus in FIGS. 1 and 3–7 can be used as input light in any appropriate and compatible optical processing apparatus, such as the apparatuses of the related patents and patent applications cited in the Background section above, to provide light with intensity responsive to a quantity obtained from a digital electrical circuit with no need for conversion to an electrical analog signal. Also light beams in other portions of the apparatuses can be modulated in response to digital electrical signals, without conversion to analog electrical signals, by substituting apparatus as in FIGS. 1 and 3-7 in obvious ways for the corresponding portions of the apparatuses in the cited patents and applications.

Figure 3:
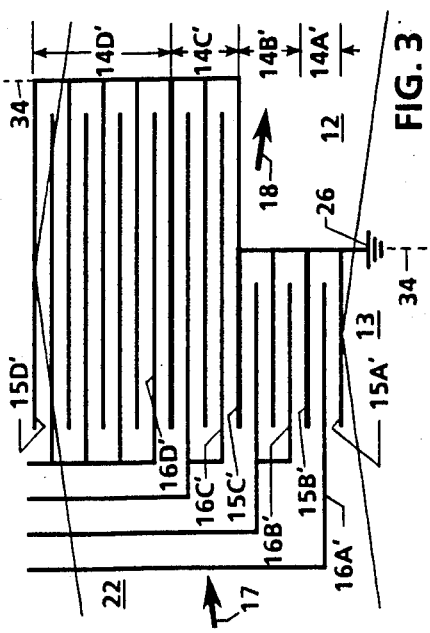
FIG. 3 shows a modified form for a portion of the apparatus in FIG. 1.
Figure 2:
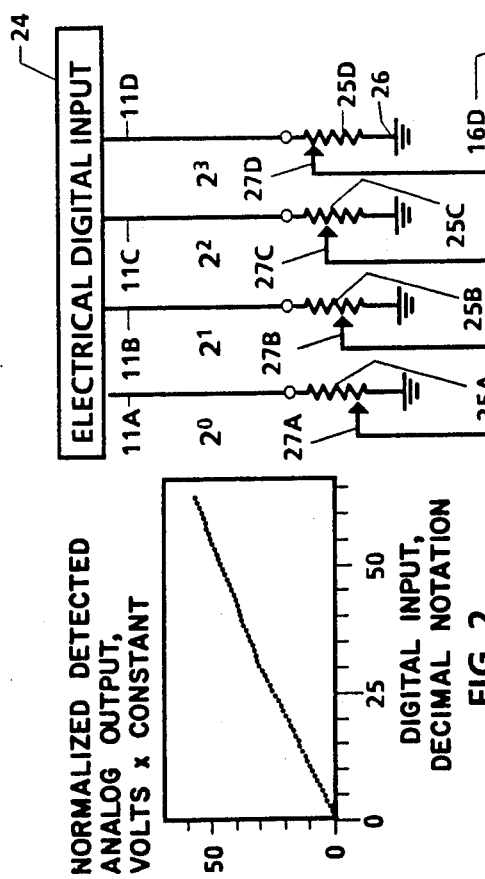
FIG. 2 is a graph in cartesian coordinates showing normalized values of analog output against digital input as measured for apparatus as in FIG. 1.

Apparatus as in Patent A, FIG. 2, can be modified according to the present FIG. 4 or FIG. 6; apparatus as in Patent A, FIG. 3, can be modified according to the present FIG. 5 or FIG. 7; and apparatus as in Patent A, FIG. 5, also can be modified according to the present FIG. 5 or FIG. 7.

Apparatus as in Application C can be modified to multiply the difference output light from one or more segments by digitally represented quantities, by inserting the optical modulation portions of any of the present FIGS. 1 and 3-7 in either the input or the output side (or both, where preferred, to multiply by two quantities using the techniques of FIGS. 4-7).

Apparatus as in Application G, FIG. 2, can be modified according to the present FIG. 4 or FIG. 6; apparatus as in Application G; FIGS. 3 and 10, can be modified according to the present FIG. 5 or FIG. 7; and apparatus as in Application G, FIGS. 5, 7, 11, and 12, can be modified in their input portions according to the present FIG. 1, and/or in their modulating portions according to the present FIGS. 4 or 6 (preferably not both in modification according to FIG. 6, as this would require three sizes of IOSLM's and the largest might be too large for advantageous operations).

Apparatus as in Application D, FIGS. 3 and 4, and apparatus as in Applications E and F, FIGS. 3-6 and 8-10, can be modified in their input portions according to the present FIG. 1, and/or in their modulating portions according to the present FIGS. 4 or 6 (preferably not both in modification according to FIG. 6, as this would require more than two sizes of IOSLMs and the largest might be too large for advantageous operations).

The above typical examples are only a few of the many applications of the present invention that can be made in obvious ways using present technology, or using future technology as it becomes available.

As is discussed also in the Background section above:

The D/A converter is fabricated upon a planar single-mode Ti-indiffused $LiNbO_3$ waveguide. The active element is an electrooptic integrated optic spatial light modulator (IOSLM),[4] which is simply an extended interdigital electrode structure composed of a number of separately addressable segments. The electrode segments are addressed, in parallel, with the voltages representing the digital word to be converted.

In the configuration tested, it is essential that a digital zero be represented by a zero voltage and that all digital ones be represented by a voltage V. As shown in FIG. 1, the voltages representing the digital word are applied to the electrodes through voltage dividers. The dividers are set so that the voltage V, when representing the most significant bit, results in the diffraction of an optical power which we may represent by $P_{max}$. The next divider is set so that the diffracted power is $P_{max}/2$, the next to generate $P_{max}/4$, and so on. The total optical power diffracted by the structure is, therefore, the optical analog representation of the electrical digital input.

This optical analog signal may then be used as the input to an analog optical device such as a multiplier,[4] or a lens can be used to direct all of the diffracted light to a photodetector, in which case the electrical analog signal is generated.

FIG. 2 shows the results of a simple proof-of-principle experiment, which was set up by uniformly illuminating the IOSLM with a prism-coupled guided plane wave. The diffracted light was collected by an external lens and directed onto a photodetector. The voltage dividers were individually set as described above, and the system was stepped manually through the digital words 000000 to 111111 by use of toggle switches. The figure shows the analog voltage generated by the photodetector as a function of the digital input word. As can be seen, the system functioned as expected. The kink in the otherwise straight line is thought to be due to a slight missetting of one of the voltage dividers.

The high-speed performance of the integrated optic D/A can be estimated by assuming, for example, that a laser will be used which will result in a diffracted power of 50 $\mu W$ from the most significant bit. In this case the maximum diffracted power, when all 6 bits are on, will be 98.44 $\mu W$, and the contribution of the least significant bit (LSB) will be 1.56 $\mu W$, a value which is $-36$ dB down from the maximum. It can be shown that, for direct detection of a 100 $\mu W$ signal at a 100-MHz bandwidth, the signal to noise ratio (SNR) of an optical detector is 60 dB.[5] Therefore, the LSB can be detected with an excess SNR of 24 dB. This excess can be retained to achieve a minimum error rate, to increase the number of bits, to increase the operating rate, or to decrease the optical power.

References
1. F. J. Leonberger, C. E. Woodward, and R. A. Becker, Appl. Phys. Lett. 40, 565 (1982).
2. H. F. Taylor, Proc. IEEE 63, 1524 (1979).
3. C. L. Chang and C. S. Tsai, Appl. Phys. Lett. 43, 22 (1983).
4. C. M. Verber, R. P. Kenan, and J. R. Busch, Appl. Opt. 20, 1626 (1981). U.S. Pat. No. 4,415,226; Nov. 15, 1983. U.S. Pat. No. 4,403,833; Sept. 13, 1983.
5. From curves prepared by S. Kingsley, Battelle Columbus Laboratories, private communication based upon W. K. Pratt, "Laser Communication Systems" (Wiley, N.Y. 1969).

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:
1. Apparatus for receiving electrical input potentials representing respectively the values of components of weighted digital input data, and for providing analog optical output approximately proportional to the sum of the weighted digital values in the input data, comprising
an electrooptic waveguide,
a plurality of adjacent electrooptic diffractive means, each responsive to a separate component of the digital input data and comprising a first electrode and a second electrode on the waveguide for temporarily changing the index of refraction, when different electrical potentials are present thereon, and thus forming a Bragg grating therein posi- tioned with a direction of Bragg incidence approximately in the same predetermined input direction and with a direction of Bragg diffraction approximately in the same predetermined output direction, light input means for directing light of known or controlled intensity to enter into each diffractive means approximately in the predetermined input direction, and means for providing an electrical potential to each electrode in each diffractive means, such that the difference between the potential at the first electrode and the potential at the second electrode is substantially zero for each diffractive means responsive to a component of the digital input data having the value of zero, and the difference between the potential at the first electrode and the potential at the second electrode for each diffractive means responsive to a component of the digital input data having a value greater than zero is such as to form a Bragg grating that diffracts in the predetermined output direction a portion of the input light having an intensity approximately proportional to the weighted value of that component of the digital input data, the components of the digital input data being weighted, as in binary computation, proportionally to successive integral powers of two, and comprising an additional electrooptic diffractive means located to receive the light travelling beyond each of the plurality of first-mentioned diffractive means, and responsive also to electrical input potentials representing values of analog input data; the additional diffractive means comprising a third electrode and a fourth electrode on the waveguide for temporarily changing the index of refraction, when different electrical potentials are present thereon, and thus forming a Bragg grating therein positioned with a direction of Bragg incidence approximately in the predetermined output direction of the plurality of first-mentioned diffractive means and with a direction of Bragg diffraction approximately in a predetermined different output direction; and means for providing one electrical potential to the third electrode and another electrical potential to the fourth electrode, and thereby to direct in the different output direction light having a total intensity that is approximately proportional to the product of the value represented by the digital input data multiplied by the value represented by the analog input data.

2. Apparatus as in claim 1, comprising a plurality of such apparatuses, each arranged adjacent to and in tandem with another, and thereby to direct in the different output direction light having a total intensity that is approximately proportional to the sum of the individual products of values represented by the input data to the individual apparatuses and thus is responsive to the vector inner product of the two vectors comprising respectively the set of individual digital input values and the set of individual analog values.

3. Apparatus as in claim 2, comprising also output means for receiving the light travelling beyond the additional diffractive means in the different output direction and directing substantially all of it to means for providing an electric signal of amplitude responsive to the intensity of the light and thus providing an indication responsive to the said vector inner product.

4. Apparatus as in claim 3, comprising a plurality of such apparatuses each receiving digital inputs representing individual values in a matrix (or in a vector) and analog inputs representing individual values in a vector (or in a matrix) and thus providing a set of electrical signals useful for providing indications responsive to the product of the matrix multiplied by the vector.

5. Apparatus for receiving electrical input potentials representing respectively the values of components of weighted digital input data, and for providing analog optical output approximately proportional to the sum of the weighted digital values in the input data, comprising an electrooptic waveguide, a plurality of adjacent electrooptic diffractive means, each responsive to a separate component of the digital input data and comprising a first electrode and a second electrode on the waveguide for temporarily changing the index of refraction, when different electrical potentials are present thereon, and thus forming a Bragg grating therein positioned with a direction of Bragg incidence approximately in the same predetermined input direction and with a direction of Bragg diffraction approximately in the same predetermined output direction, light input means for directing light of known or controlled intensity to enter into each diffractive means approximately in the predetermined input direction, and means for providing an electrical potential to each electrode in each diffractive means, such that the difference between the potential at the first electrode and the potential at the second electrode is substantially zero for each diffractive means responsive to a component of the digital input data having the value of zero, and the difference between the potential at the first electrode and the potential at the second electrode for each diffractive means responsive to a component of the digital input data having a value greater than zero is such as to form a Bragg grating that diffracts in the predetermined output direction a portion of the input light having an intensity approximately proportional to the weighted value of that component of the digital input data, the components of the digital input data being weighted, as in binary computation, proportionally to successive integral powers of two, and comprising a plurality of sets of additional electrooptic diffractive means located to receive the light travelling beyond each of the plurality of first-mentioned diffractive means, and responsive also to electrical input potentials representing additional digital input data; each set of additional diffractive means comprising a plurality of adjacent electrooptic diffractive means, each responsive to a separate component of the additional digital input data, and comprising a third electrode and a fourth electrode on the waveguide for temporarily changing the index of refraction, when different electrical potentials are present thereon, and thus forming a Bragg grating therein positioned with a direction of Bragg incidence approximately in the predetermined output direction of the plurality of first-mentioned diffractive means and with a direction of Bragg diffraction approximately in another predetermined output direction; each set of additional diffractive means being located to receive the light travelling beyond a different one of the first-mentioned plurality of adjacent diffractive means; and means for providing one electrical potential to the third electrode and another electrical potential to the fourth electrode of each additional diffractive means according to the value of its component of the additional digital input data, and thereby to direct in the other output direction light having a total intensity that is approximately proportional to the product of the value represented by the first-mentioned digital input data multiplied by the value represented by the additional digital input data.

6. Apparatus as in claim 5, comprising a plurality of such apparatuses, each arranged adjacent to and in tandem with another, and thereby to direct in the other output direction light having a total intensity that is approximately proportional to the sum of the individual products of values represented by the input data to the individual apparatuses and thus is responsive to the vector inner product of the two vectors comprising the two sets of individual digital input values.

7. Apparatus as in claim 6, comprising also output means for receiving the light travelling beyond the additional diffractive means in the other output direction and directing substantially all of it to means for providing an electric signal of amplitude responsive to the intensity of the light and thus providing an indication responsive to the said vector inner product.

8. Apparatus as in claim 7, comprising a plurality of such apparatuses each receiving digital inputs representing individual values in a matrix and digital inputs representing individual values in a vector and thus providing a set of electrical signals useful for providing indications responsive to the product of the matrix multiplied by the vector.

* * * * *